US011007699B2

(12) United States Patent
Yashiki et al.

(10) Patent No.: US 11,007,699 B2
(45) Date of Patent: May 18, 2021

(54) METHOD OF PRODUCING FILM, METHOD OF PRODUCING SEPARATOR, AND METHOD OF PRODUCING PLASTICIZER

(71) Applicant: Sumitomo Chemical Company, Limited, Tokyo (JP)

(72) Inventors: Daizaburo Yashiki, Niihama (JP); Shinichi Yamate, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 407 days.

(21) Appl. No.: 15/910,638

(22) Filed: Mar. 2, 2018

(65) Prior Publication Data

US 2018/0250863 A1 Sep. 6, 2018

(30) Foreign Application Priority Data

Mar. 3, 2017 (JP) .............................. JP2017-041091

(51) Int. Cl.
 *B29C 48/25* (2019.01)
 *B29C 55/04* (2006.01)
 (Continued)

(52) U.S. Cl.
 CPC .............. *B29C 48/267* (2019.02); *B29B 7/60* (2013.01); *B29C 48/0018* (2019.02);
 (Continued)

(58) Field of Classification Search
 CPC .................................................. B29C 48/267
 See application file for complete search history.

(56) References Cited

U.S. PATENT DOCUMENTS

2010/0099838 A1* 4/2010 Takeda ................... B01D 71/26
 526/348
2012/0015229 A1 1/2012 Ohashi et al.
 (Continued)

FOREIGN PATENT DOCUMENTS

CN 104066781 A 9/2014
EP 3252850 A1 12/2017
 (Continued)

OTHER PUBLICATIONS

Ullmann, Fritz. (2005). Ullmann's Chemical Engineering and Plant Design, vols. 1-2—16.5 Advantages and Disadvantages of Different Separation Methods. John Wiley & Sons. Retrieved from https://app.knovel.com/hotlink/pdf/id:kt007EG221/ullmanns-chemical-engineering/advantages-disadvantages (Year: 2005).*
 (Continued)

*Primary Examiner* — Galen H Hauth
(74) *Attorney, Agent, or Firm* — Panitch Schwarze Belisario & Nadel LLP

(57) ABSTRACT

A method of producing a film in accordance with an aspect of the present invention includes: a first kneading and forming step of forming a composition obtained by kneading a polyolefin resin and a plasticizer; a stretching step of stretching the composition; a composition cleaning step of immersing the composition in a cleaning solvent and removing the plasticizer; a separation step of separating, from the cleaning solvent which has been used in the cleaning step, the plasticizer which has been eluted in the cleaning solvent; and a second kneading and forming step of forming a composition obtained by kneading a polyolefin resin and the plasticizer which has been separated in the separation step.

17 Claims, 5 Drawing Sheets

(51) Int. Cl.
  *H01M 2/14* (2006.01)
  *H01M 2/16* (2006.01)
  *B29C 48/08* (2019.01)
  *B29C 48/00* (2019.01)
  *B29D 7/01* (2006.01)
  *B29B 7/60* (2006.01)
  *B29C 48/27* (2019.01)
  *B29K 105/00* (2006.01)
  *B29L 31/34* (2006.01)
  *H01M 10/0525* (2010.01)
  *B29C 55/16* (2006.01)
  *B29K 105/04* (2006.01)
  *B29K 105/26* (2006.01)
  *B29C 48/275* (2019.01)
  *H01M 50/403* (2021.01)
  *H01M 50/411* (2021.01)
  *H01M 50/449* (2021.01)

(52) U.S. Cl.
  CPC ............ *B29C 48/08* (2019.02); *B29C 48/274* (2019.02); *B29C 55/04* (2013.01); *B29D 7/01* (2013.01); *H01M 50/403* (2021.01); *H01M 50/411* (2021.01); *B29C 48/278* (2019.02); *B29C 55/16* (2013.01); *B29K 2023/06* (2013.01); *B29K 2105/0038* (2013.01); *B29K 2105/0044* (2013.01); *B29K 2105/041* (2013.01); *B29K 2105/26* (2013.01); *B29L 2031/3468* (2013.01); *H01M 10/0525* (2013.01); *H01M 50/449* (2021.01)

(56) References Cited

U.S. PATENT DOCUMENTS

| | | |
|---|---|---|
| 2013/0011744 A1 | 1/2013 | Takata et al. |
| 2013/0043613 A1* | 2/2013 | Kawasoe ............... C08J 5/18 264/49 |
| 2013/0337311 A1 | 12/2013 | Itou |
| 2014/0329127 A1 | 11/2014 | Ohashi et al. |
| 2014/0329128 A1 | 11/2014 | Ohashi et al. |
| 2014/0329129 A1 | 11/2014 | Ohashi et al. |
| 2014/0349168 A1 | 11/2014 | Yashiki et al. |
| 2014/0361457 A1 | 12/2014 | Nogata |
| 2015/0004466 A1 | 1/2015 | Yashiki |
| 2016/0064713 A1 | 3/2016 | Itou |
| 2016/0254513 A1 | 9/2016 | Ohashi et al. |
| 2017/0338458 A1 | 11/2017 | Itou |
| 2018/0036933 A1 | 2/2018 | Ichinomiya et al. |

FOREIGN PATENT DOCUMENTS

| | | |
|---|---|---|
| JP | 2013159750 A | 8/2013 |
| JP | 2016143469 A | 8/2016 |
| KR | 20080035596 A | 4/2008 |
| KR | 20120083465 A | 7/2012 |
| KR | 20130009982 A | 1/2013 |
| KR | 20140021033 A | 2/2014 |
| KR | 1592075 B1 | 2/2016 |
| WO | 2012090632 A1 | 7/2012 |
| WO | 2016132807 A1 | 8/2016 |

OTHER PUBLICATIONS

Office Action dated Oct. 27, 2018 in KR Application No. 10-2018-0025132.
Office Action dated Apr. 27, 2018 in KR Application No. 10-2018-0025132.
Office Action dated Feb. 19, 2021 in CN Application No. 201810173216.6.

* cited by examiner

METHOD OF PRODUCING FILM, METHOD OF PRODUCING SEPARATOR, AND METHOD OF PRODUCING PLASTICIZER

This Nonprovisional application claims priority under 35 U.S.C. § 119 on Patent Application No. 2017-041091 filed in Japan on Mar. 3, 2017, the entire contents of which are hereby incorporated by reference.

TECHNICAL FIELD

The present invention relates to a film producing method, a separator producing method, and a plasticizer producing method.

BACKGROUND ART

As a separator for use in a nonaqueous electrolyte secondary battery such as a lithium ion secondary battery, there has been used a microporous film that contains a polyolefin resin as a main component, or a laminated porous film that includes (i) the microporous film as a base material and (ii) a functional layer provided on the microporous film.

A microporous film to serve as a base material for a separator is produced as below. Specifically, a composition obtained by kneading a polyolefin resin such as a polyethylene (PE) resin and a plasticizer such as liquid paraffin or calcium carbonate is formed into a film composition and stretched. Then, the stretched film composition is made into a porous film by removing the plasticizer which is contained therein. The microporous film is thus produced. Patent Literatures 1 and 2 each disclose a technique related to production of such a microporous film.

CITATION LIST

Patent Literatures

[Patent Literature 1]
Japanese Patent Application Publication, Tokukai, No. 2013-159750 (Publication date: Aug. 19, 2013)
[Patent Literature 2]
Japanese Patent Application Publication, Tokukai, No. 2014-102882 (Publication date: Jun. 5, 2014)

SUMMARY OF INVENTION

Technical Problem

Note here that a plasticizer with which to knead polyolefin is added in a large amount to a polyolefin resin in view of processability of a raw material and/or a physical property of a microporous film to be finally obtained. Thus, in a case where a plasticizer contained in a stretched film composition is removed from that film composition by immersing the film composition in a cleaning solvent, the plasticizer has been eluted in a large amount in the cleaning solvent which has been used. However, conventionally, a plasticizer eluted in a used cleaning solvent has been disposed of. This results in a problem of an enormous amount of use of a plasticizer.

An aspect of the present invention has been made in view of the problem, and an object of an aspect of the present invention is to allow a plasticizer to be used in a smaller amount during film production.

Solution to Problem

In order to attain the object, a method of producing a film in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition; an elution step including immersing, in a cleaning solvent, the first film composition which has been stretched, and eluting the plasticizer from the first film composition to form a microporous film; a separation step including separating, from the cleaning solvent which has been used in the elution step, the plasticizer which has been eluted in the cleaning solvent; a second kneading step including kneading at least a second polyolefin resin and the plasticizer which has been separated in the separation step to form a second composition; and a second forming step including forming the second composition into a second film composition.

In order to attain the object, a method of producing a film in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition, wherein an amount of the plasticizer is released from either the first composition or the first film composition in at least one of the first kneading step, the first forming step and the stretching step; an elution step including immersing, in a cleaning solvent, the first film composition which has been stretched, and eluting the plasticizer from the first film composition to form a microporous film; a collection step including collecting the amount of the plasticizer which has been released from the first composition or the first film composition in at least one of the first kneading step, the first forming step and the stretching step; a second kneading step including kneading at least a second polyolefin resin and the plasticizer which has been collected in the collection step to form a second composition; and a second forming step including forming the second composition into a second film composition.

In order to attain the object, a method of producing a film in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition; an elution step including immersing, in a cleaning solvent, the first film composition which has been stretched, and eluting the plasticizer from the first film composition to form a microporous film; a collection step including collecting an amount of the plasticizer from at least one of (i) a plasticizer which has been released from the first composition or the first film composition in at least one of the first kneading step, the first forming step and the stretching step, and (ii) a plasticizer which has been eluted from the first film composition in the elution step and separated from the cleaning solvent which has been used in the elution step; a second kneading step including kneading at least a second polyolefin resin and the plasticizer which has been collected in the collection step to form a second composition; and a second forming step including forming the second composition into a second film composition.

In order to attain the object, a method of producing a plasticizer in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition;

an elution step including immersing, in a cleaning solvent, the first film composition which has been stretched, and eluting the plasticizer from the first film composition to form a microporous film; and a separation step including separating, from the cleaning solvent which has been used in the elution step, the plasticizer which has been eluted in the cleaning solvent.

In order to attain the object, a method of producing a plasticizer in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition, wherein an amount of the plasticizer is released from either the first composition or the first film composition in at least one of the first kneading step, the first forming step and the stretching step; an elution step including immersing, in a cleaning solvent, the first film composition which has been stretched, and eluting the plasticizer from the first film composition to form a microporous film; and a collection step including collecting the amount of the plasticizer which has been released from the first composition or the first film composition in at least one of the first kneading step, the first forming step and the stretching step.

In order to attain the object, a method of producing a plasticizer in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition;

an elution step including immersing, in a cleaning solvent, the first film composition which has been stretched, and eluting the plasticizer from the first film composition to form a microporous film; and a collection step including collecting an amount of the plasticizer from at least one of (i) a plasticizer which has been released from the first composition or the first film composition in at least one of the first kneading step, the first forming step and the stretching step, and (ii) a plasticizer which has been eluted from the first film composition in the elution step and separated from the cleaning solvent which has been used in the elution step.

Advantageous Effects of Invention

An aspect of the present invention allows a plasticizer to be used in a smaller amount during film production.

DESCRIPTION OF EMBODIMENTS

Embodiment 1

Figure 1:
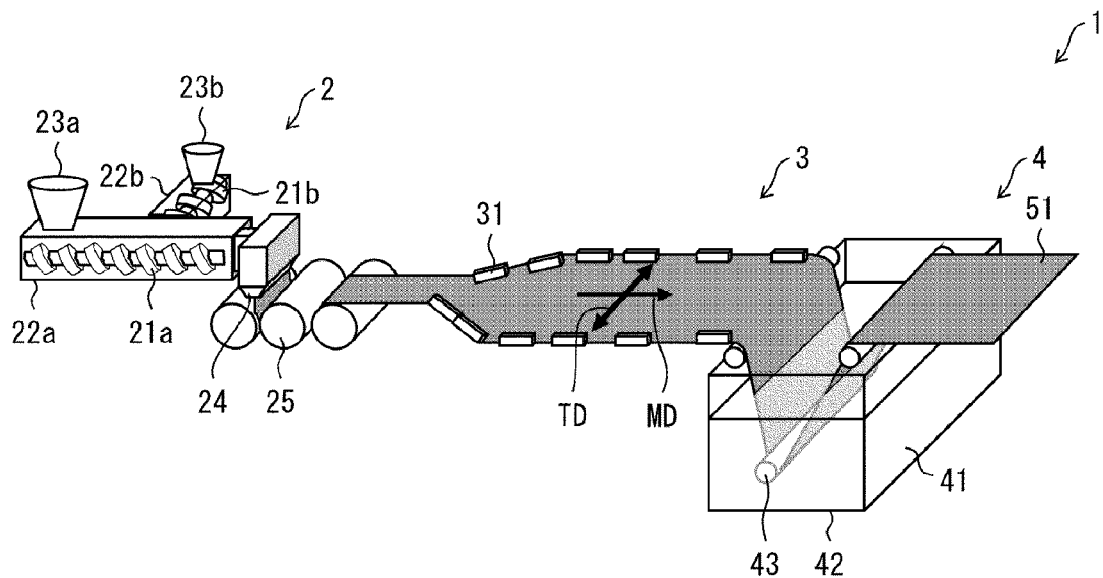
FIG. 1 is a perspective view illustrating an apparatus for producing a separator original sheet in accordance with Embodiment 1 of the present invention.
Figure 2:
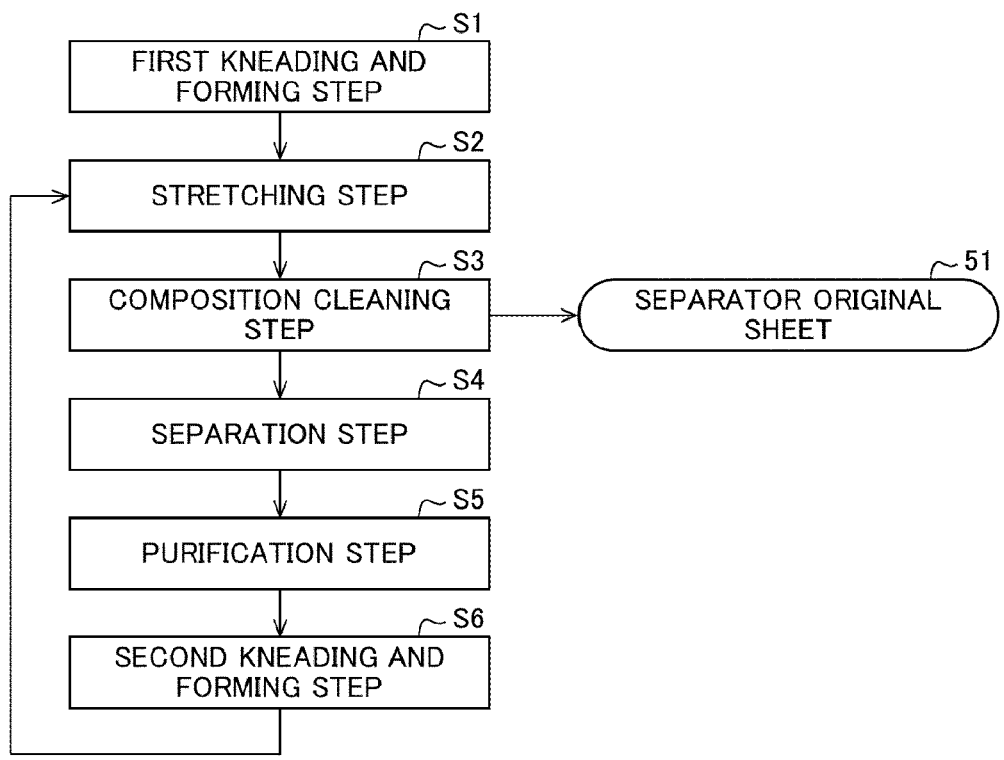
FIG. 2 is a flow chart schematically showing a method for producing the separator original sheet in accordance with Embodiment 1 of the present invention.

The following description discusses an embodiment of the present invention with reference to FIGS. 1 and 2. The description of Embodiment 1 discusses an example of a case where a film producing method in accordance with an aspect of the present invention is applied to production of a separator original sheet that is to serve as a base material for a separator for a lithium ion secondary battery (hereinafter may be referred to as a "separator").

Note, however, that the film producing method in accordance with an aspect of the present invention is applicable not only to production of a separator original sheet but also to production of another kind of film by use of a plasticizer.

(Separator Original Sheet Producing Apparatus)

FIG. 1 a perspective view illustrating an apparatus for producing a separator original sheet in accordance with Embodiment 1. A separator original sheet 51 is produced as below. Specifically, a composition obtained by melting and kneading a polyolefin resin such as a polyethylene resin and a plasticizer such as liquid paraffin is formed into a film composition and stretched. Then, the stretched film composition is made into a porous film by removing the plasticizer which is contained therein. The separator original sheet 51 is thus produced. An apparatus 1 for producing the separator original sheet in accordance with Embodiment 1 (hereinafter referred to as a "separator original sheet producing apparatus 1") includes a kneading and forming device 2, a stretching device 3, and a cleaning device 4.

The kneading and forming device 2 melts and kneads (hereinafter may be referred to as "kneads") at least a polyolefin resin and a plasticizer, and forms, into a film composition, a composition obtained by the kneading. The kneading and forming device 2 is, for example, a screw extruding device.

According to Embodiment 1, the kneading and forming device 2 includes (i) a cylinder 22a that includes therein a screw 21a and (ii) a cylinder 22b that is substantially perpendicularly connected to a side surface of the cylinder 22a and includes therein a screw 21b. The cylinder 22a and the cylinder 22b have respective inner parts that communicate with each other.

For example, the kneading and forming device 2 is arranged such that a polyolefin resin is fed into the cylinder 22a via a feed opening 23a of the cylinder 22a, and a plasticizer is fed into the cylinder 22b via a feed opening 23b of the cylinder 22b. The plasticizer which has been fed into the cylinder 22b via the feed opening 23b is introduced into the cylinder 22a by rotation of the screw 21b. This causes the polyolefin resin which has been fed into the cylinder 22a via the feed opening 23a and the plasticizer which has been fed into the cylinder 22b via the feed opening 23b to be kneaded in the cylinder 22a by rotation of the screw 21a. A composition containing the polyolefin resin and the plasticizer which have been kneaded in the cylinder 22a is extruded from the cylinder 22a via an extrusion opening 24 provided for the cylinder 22a. The composition which has been extruded from the cylinder 22a via the extrusion opening 24 is formed into a film composition by being wound onto a plurality of rollers 25.

The kneading and forming device 2 in accordance with Embodiment 1 includes two cylinders, which are the cylinder 22a and the cylinder 22b. Note, however, that it is also possible to provide no cylinder 22b. In a case where no cylinder 22b is provided, a polyolefin resin and a plasticizer are fed into the cylinder 22a via the feed opening 23a.

The stretching device 3 at least uniaxially stretches the film composition thus formed. The stretching device 3 is a tenter stretching device that stretches a film composition by a tenter stretching method. The tenter stretching device has a mechanism in which a plurality of chucks, which hold both edges of a film, move on tenter rails so that the film is uniaxially or biaxially stretched continuously.

The stretching device 3 in accordance with Embodiment 1 stretches a film composition biaxially, i.e., in a machine direction (MD) in which a film composition is transferred (hereinafter referred to as a "transfer direction MD") and in a transverse direction (TD) in which a width of the film composition extends) (hereinafter referred to as a "width direction TD"). Specifically, the film composition is stretched in a stretching furnace (not illustrated) by lengthening intervals between chucks 31, which fix the film composition, in the transfer direction MD and in the width direction TD. That is, in accordance with the chucks 31 which extend in the width direction TD while moving in the transfer direction MD, the film composition is pulled and stretched in the transfer direction MD and in the width direction TD.

Note that the width direction TD means a direction that (i) is substantially orthogonal to the transfer direction (longer side direction) MD in which a film is transferred and (ii) is substantially parallel to a surface of the film.

The cleaning device 4 immerses the film composition thus stretched in a cleaning liquid (cleaning solvent) 41 and removes a plasticizer from the film composition. The cleaning device 4 includes a cleaning layer 42 in which the cleaning liquid 41 such as methylene chloride is stored. The plasticizer is removed from the film composition by transferring the film composition by use of a plurality of rollers 43 while immersing the film composition in the cleaning liquid 41.

(Separator Original Sheet Producing Method)

The following description discusses a separator original sheet producing method (film producing method) with reference to FIG. 2. The description of Embodiment 1 takes, as an example, a case where a polyethylene resin is mainly contained as a polyolefin resin that is to serve as a material for a separator original sheet.

FIG. 2 is a flow chart schematically showing a method for producing the separator original sheet in accordance with Embodiment 1. A production flow shown in FIG. 2 shows a case where the separator original sheet 51 is made of a polyethylene resin including an ultra-high molecular weight polyethylene resin. In this case, a flow of production of the separator original sheet 51 includes a first kneading and forming step S1, a stretching step S2, a composition cleaning step (cleaning step) S3, a separation step S4, a purification step S5, and a second kneading and forming step S6 (see FIG. 2).

(First Kneading and Forming Step S1)

The first kneading and forming step S1 is a step of kneading at least a polyethylene resin and a plasticizer, and forming a resulting mixture into a film. In the first kneading and forming step S1, a polyethylene resin composition is obtained by, for example, feeding (i) powder of an ultra-high molecular weight polyethylene resin and (ii) a plasticizer into the kneading and forming device 2, and kneading the above (i) and (ii). Then, the polyethylene resin composition thus obtained is extruded in a form of a sheet and transferred while being wound onto the plurality of rollers 25. This makes it possible to obtain a film composition obtained by forming the polyethylene resin composition into a film. While the polyethylene resin composition thus extruded is being cooled, the polyethylene resin and the plasticizer are phase-separated by spinodal decomposition.

Examples of the plasticizer include saturated hydrocarbons such as liquid paraffin and paraffin wax; phthalate esters such as dibutyl phthalate, bis(2-ethylhexyl)phthalate, dioctyl phthalate, and dinonyl phthalate; and unsaturated or saturated higher alcohols such as oleyl alcohol and stearyl alcohol.

In the first kneading and forming step S1, an additive such as an antioxidant in addition to the polyolefin resin can be appropriately fed into the cylinder 22a via the feed opening 23a of the cylinder 22a.

(Stretching Step S2)

The stretching step S2 is a step of at least uniaxially stretching the formed film composition obtained in the previous step S1. In the stretching step S2, the film composition which is being transferred is stretched in the transfer direction MD and/or the width direction TD by use of the stretching device 3 while being heated to a given temperature.

(Composition Cleaning Step S3)

The composition cleaning step S3 is a step of immersing, in the cleaning liquid 41, the stretched film composition obtained in the previous step S2, and removing the plasticizer from the film composition. In the composition cleaning step S3, the film composition is immersed in the cleaning liquid 41 so that the plasticizer is dissolved and removed. The separator original sheet 51, which is a microporous film, is thus obtained. Examples of a compound for use in the cleaning liquid 41 include hydrocarbons such as pentane, hexane, and heptane; alcohols such as methanol, ethanol, and isopropanol; ketones such as acetone and methylethylketone; and chlorine hydrocarbons such as methylene chloride and 1,1,1-trichloroethane. The cleaning liquid 41 which has a low boiling point is preferable because such a cleaning liquid 41 allows the plasticizer to be easily taken out in the separation step and the purification step, which are described later.

Note that the separator original sheet 51 which contains other material(s) can also be produced by a similar production flow.

Note here that the plasticizer has been eluted in a large amount in the cleaning liquid 41 which has been used. In view of this, in order to separate the plasticizer from the cleaning liquid 41 which has been used in the composition cleaning step S3 and to reuse the separated plasticizer, the production flow in accordance with Embodiment 1 includes the separation step S4 and the purification step S5 which follow the first kneading and forming step S1, the stretching step S2, and the composition cleaning step S3 (a plasticizer producing method). Then, the plasticizer which has been separated from the cleaning liquid 41 in the separation step S4 and purified in the purification step S5 is fed into the kneading and forming device 2 in the second kneading and forming step S6 so that the plasticizer and a polyethylene resin are kneaded. The plasticizer which has been eluted in the cleaning liquid 41 which has been used thus can be reused to produce the separator original sheet 51.

That is, according to the production flow in accordance with Embodiment 1, the first kneading and forming step S1, the stretching step S2, the composition cleaning step S3, the separation step S4, and the purification step S5 are carried out in this order, and then the second kneading and forming step S6, the stretching step S2, the composition cleaning step S3, the separation step S4, and the purification step S5 are carried out in this order repeatedly.

(Separation Step S4)

The separation step S4 is a step of separating, from the cleaning liquid 41 which has been used, the plasticizer which has been eluted in the cleaning liquid 41. The plasticizer which is separated, in the separation step S4, from the cleaning liquid 41 which has been used is purified in the subsequent purification step S5, and then the plasticizer is reused to produce the separator original sheet 51. A method for separating the plasticizer is exemplified by but not particularly limited to various methods such as distillation and extraction, provided that the method allows the plasticizer to be separated from the cleaning liquid 41. In a case where the purification step S5 (described later) is carried out, the cleaning liquid 41 does not need to be completely removed in the separation step S4, and the cleaning liquid 41 which remains can be eliminated in the subsequent purification step S5. Further, the separation step S4 and the purification step S5 can be concurrently carried out.

(Purification Step S5)

The purification step S5 is a step of purifying the plasticizer which has been separated in the separation step S4. In the plasticizer which has been separated in the separation step S4, impurities such as an antioxidant, a polymerization initiator, and/or denatured product(s) thereof may be mixed. For example, in the composition which is prepared in the first kneading and forming step S1 by kneading the polyolefin resin and the plasticizer, the antioxidant may be contained in a given amount. An increase (a change) in amount of the antioxidant etc. contained in the composition per unit amount (hereinafter may be referred to as an "antioxidant etc. content") may cause the following problems:

(1) the problem such that the polyolefin resin and the plasticizer are prevented from being phase-separated or are induced to have an unintended phase-separated structure;

(2) the problem such that an excess antioxidant, an excess denatured product thereof, and/or the like react(s) with the polyolefin resin and causes the separator original sheet 51 to have a lower strength; and (3) the problem such that the antioxidant etc. content in the separator original sheet 51 after the composition cleaning step S3 increases, and the antioxidant etc. react(s) with, for example, an electrolyte in a case where a separator in which the separator original sheet 51 is used is incorporated in a lithium ion secondary battery.

In view of the above problems, the antioxidant etc. content in the composition is desirably constant. In the production flow in accordance with Embodiment 1, since impurities such as an antioxidant mixed in the separated plasticizer is eliminated in the purification step S5, the plasticizer which is introduced in the second kneading and forming step S6 contains no antioxidant or only a small amount of the antioxidant. This allows the amount of the antioxidant etc. contained in the composition per unit amount to be easily maintained at a constant amount in the second kneading and forming step S6. Therefore, it is possible to prevent a change in characteristic of the separator original sheet 51 which change is caused by a change in antioxidant etc. content.

In the purification step S5, the plasticizer does not necessarily need to be purified by any particular method but is preferably purified by adsorption or distillation. The plasticizer which is purified by adsorption can be purified at a low temperature in a short time without heating. This makes it possible to purify the plasticizer without (i) energy consumption in association with heating and cooling and (ii) a change in characteristic of the plasticizer which change is caused by heating.

Further, purification of the plasticizer by distillation makes it possible to more reliably eliminate impurities from the plasticizer. This allows the plasticizer with higher purity to be obtained.

The purification step S5 does not necessarily need to be carried out and can also be omitted. Note, however, that such a change in characteristic of the separator original sheet 51 as described earlier can be prevented by carrying out the purification step S5. Therefore, the purification step S5 is preferably included in the flow of production of the separator original sheet 51.

(Second Kneading and Forming Step S6)

The second kneading and forming step S6 is a step of forming, into a film composition, a composition obtained by kneading at least a polyethylene resin and the plasticizer which has been purified in the purification step S5. The second kneading and forming step S6 is identical to the first kneading and forming step S1 except that the plasticizer which has been purified in the purification step S5 is reused therein.

In the second kneading and forming step S6, a polyethylene resin composition is obtained by, for example, feeding (i) powder of an ultra-high molecular weight polyethylene resin, (ii) the plasticizer which has been purified in the purification step S5, (iii) an additional plasticizer, and (iv) the like into the kneading and forming device 2, and kneading the above (i) to (iv). Then, the polyethylene resin composition thus obtained is extruded in a form of a sheet and transferred while being wound onto the plurality of rollers 25. This makes it possible to obtain a film composition obtained by forming, into a film, the polyethylene resin composition in which the plasticizer is reused. Examples of the additional plasticizer include a new plasticizer that has not been subjected to the separation step S4 and the purification step S5, and a plasticizer that has been subjected to a collection step S104 (described later, see FIG. 4).

Also in the second kneading and forming step S6, an additive such as an antioxidant in addition to the polyolefin resin can be appropriately fed into the cylinder 22a via the feed opening 23a of the cylinder 22a.

(Effect of Separator Original Sheet Producing Method)

As described earlier, a separator original sheet producing method in accordance with Embodiment 1 includes: a first kneading and forming step S1 of forming, into a film composition, a composition obtained by kneading at least a polyolefin resin and a plasticizer; a stretching step S2 of at least uniaxially stretching the film composition which has been formed; a composition cleaning step S3 of immersing, in a cleaning liquid 41, the film composition which has been stretched, and removing the plasticizer from the film composition; a separation step S4 of separating, from the cleaning liquid 41 which has been used in the composition cleaning step S3, the plasticizer which has been eluted in the cleaning liquid 41; and a second kneading and forming step S6 of forming, into a film composition, a composition obtained by kneading at least a polyolefin resin and the plasticizer which has been separated in the separation step S4.

Thus, according to Embodiment 1, the plasticizer which has been separated in the separation step S4 can be reused to produce the separator original sheet 51. This makes it possible to provide a separator original sheet producing method that allows a plasticizer to be used in a smaller amount.

Further, in a case where a film such as a separator is produced by using a saturated hydrocarbon such as liquid paraffin or paraffin wax as a plasticizer, such a plasticizer, which is unclear in structure and varies in quality, may cause a difference in quality of the film between lots of plasticizers to be used. According to the film producing method in accordance with Embodiment 1, since a single lot of plasticizers can be repeatedly used, it is possible to maintain, at a constant level, a quality of a film to be obtained.

Embodiment 2

Figure 3:
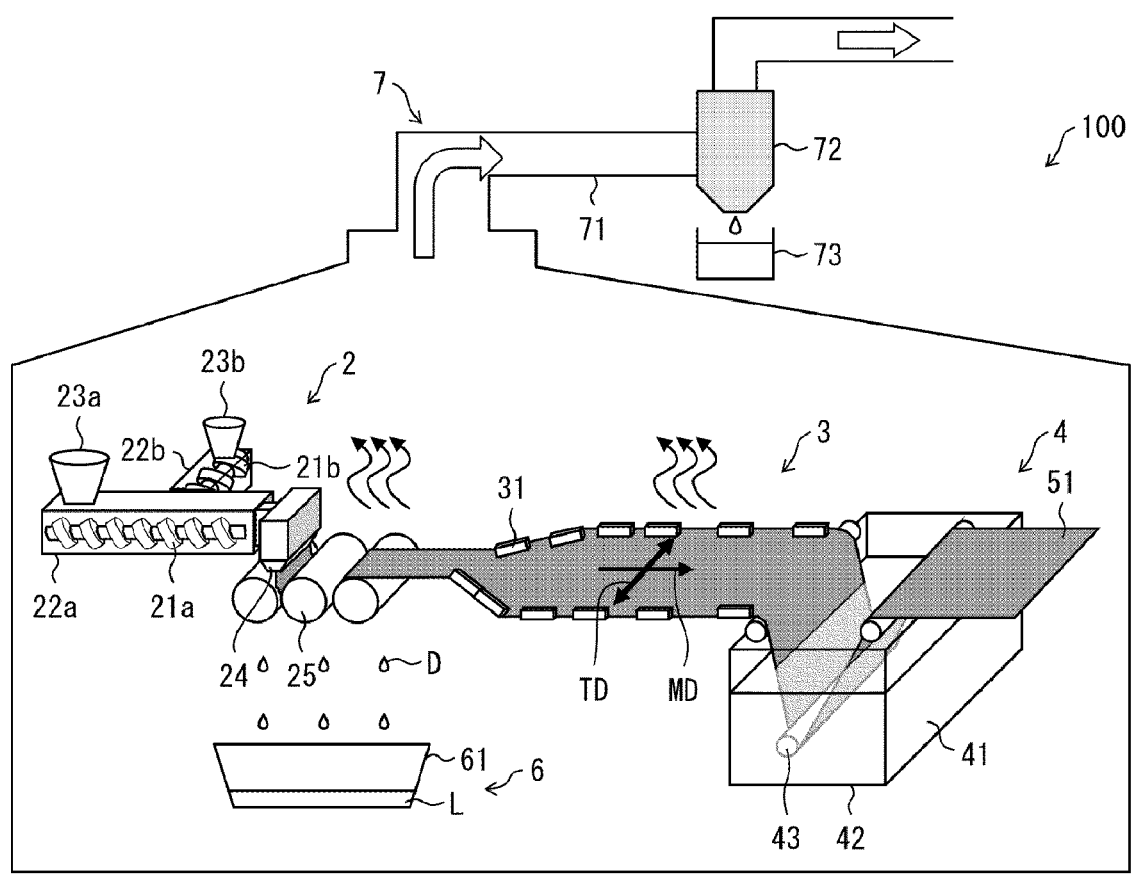
FIG. 3 is a perspective view illustrating an apparatus for producing a separator original sheet in accordance with Embodiment 2 of the present invention.
Figure 4:
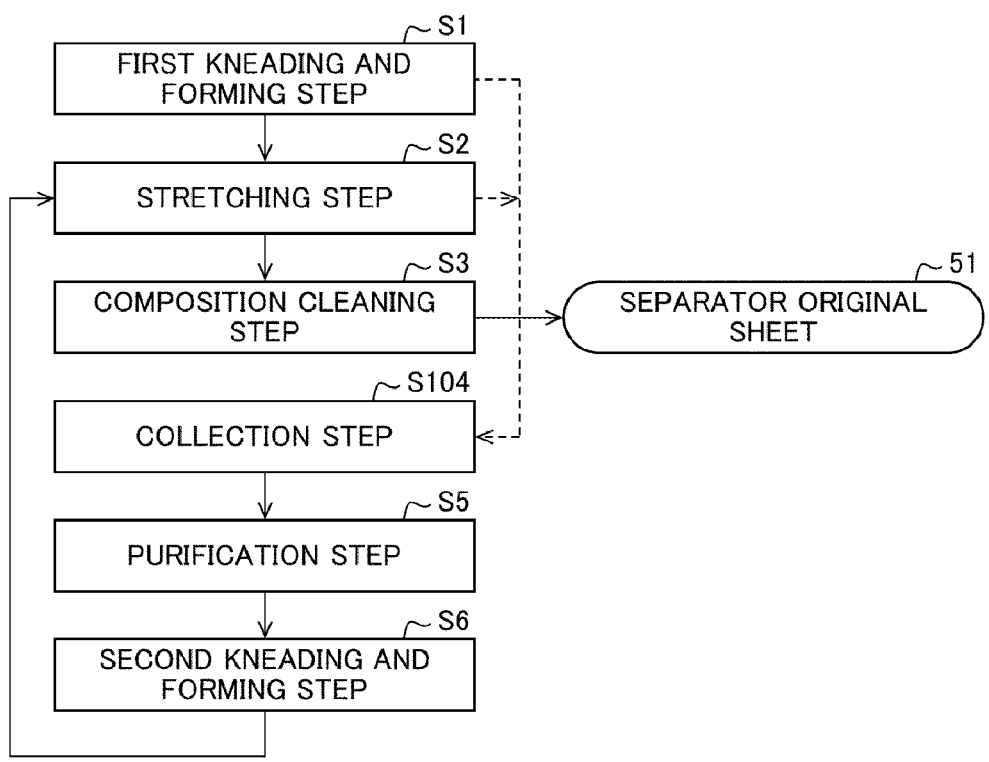
FIG. 4 is a flow chart schematically showing a method for producing the separator original sheet in accordance with Embodiment 2 of the present invention.

The following description discusses another embodiment of the present invention with reference to FIGS. 3 and 4. The description of Embodiment 2 discusses another example of the case where the film producing method in accordance with an aspect of the present invention is applied to production of a separator original sheet. Note that components identical to those described in Embodiment 1 are given respective identical reference signs, and a specific description of those components is omitted here.

(Separator Original Sheet Producing Apparatus)

FIG. 3 is a perspective view illustrating an apparatus for producing a separator original sheet in accordance with Embodiment 2. An apparatus 100 for producing the separator original sheet in accordance with Embodiment 2 (hereinafter referred to as a "separator original sheet producing apparatus 100") and the separator original sheet producing apparatus 1 (described earlier) differ mainly in that the separator original sheet producing apparatus 100 further includes a first plasticizer collecting section 6 and a second plasticizer collecting section 7.

As illustrated in FIG. 3, the separator original sheet producing apparatus 100 includes a kneading and forming device 2, a stretching device 3, a cleaning device 4, the first plasticizer collecting section 6, and the second plasticizer collecting section 7.

The first plasticizer collecting section 6 collects a plasticizer that has dropped (has been released) from a composition of a polyethylene resin in a first kneading and forming step S1 (a collection step). Specifically, the first plasticizer collecting section 6 collects a plasticizer that has dropped from a polyethylene resin composition which has been kneaded and extruded by the kneading and forming device 2 and cooled and in which a polyethylene resin and the plasticizer are phase-separated.

The first plasticizer collecting section 6 includes a container 61 that receives drops D. By causing the container 61 to receive the drops D, the first plasticizer collecting section 6 collects a plasticizer that has dropped from a film composition. In FIG. 3, liquid L that has accumulated in the container 61 is obtained by collection of the drops D by the container 61.

The second plasticizer collecting section 7 collects a plasticizer that has volatilized (has been released) from a polyethylene resin composition in the first kneading and forming step S1 and/or a stretching step S2 (the collection step). Specifically, the second plasticizer collecting section 7 collects (i) a plasticizer that has volatilized from a polyethylene resin composition which has been kneaded and extruded at a high temperature by the kneading and forming device 2 and (ii) a plasticizer that has volatilized from a polyethylene resin composition which has been stretched, while being heated, by the stretching device 3.

The second plasticizer collecting section 7 includes a suction pipe 71 through which to suck the plasticizer which has volatilized, a liquefier (so-called condenser) 72 provided to the suction pipe 71, and a container 73 provided in a place in which to receive the plasticizer which has been liquefied by the liquefier 72. The liquefier 72 is, for example, an electric precipitation mist collector, a filter mist collector, or a centrifugal mist collector. The liquefier 72 is preferably provided in an atmosphere whose temperature is controlled at a temperature that is optimal for production of a separator original sheet 51 (e.g., a clean room in which the separator original sheet producing apparatus 100 is provided). The second plasticizer collecting section 7 causes the suction pipe 71, the liquefier 72, and the container 73 to liquefy and collect the plasticizer which has volatilized.

(Separator Original Sheet Producing Method)

Next, the following description discusses a separator original sheet producing method (film producing method) with reference to FIG. 4. FIG. 4 is a flow chart schematically showing a method for producing the separator original sheet in accordance with Embodiment 2. A flow of production of the separator original sheet 51 includes the first kneading and forming step S1, the stretching step S2, a composition cleaning step S3, a collection step S104, a purification step S5, and a second kneading and forming step S6 (see FIG. 4).

The collection step S104 is a step of collecting (i) the plasticizer that has dropped from the polyethylene resin composition in the first kneading and forming step S1 and (ii) the plasticizer which has volatilized from the polyethylene resin composition in the first kneading and forming step S1 and the stretching step S2 (a plasticizer producing method). The collection step S104 carried out by the first plasticizer collecting section 6 is carried out concurrently with the first kneading and forming step S1, whereas the collection step S104 carried out by the second plasticizer collecting section 7 is carried out concurrently with at least the first kneading and forming step S1 and the stretching step S2.

In the plasticizer which has been collected in the collection step S104, impurities such as an antioxidant, a polymerization initiator, and/or denatured product(s) thereof may be mixed. Thus, the plasticizer which has been collected in the collection step S104 is preferably purified in the purification step S5.

According to the production flow in accordance with Embodiment 2, the plasticizer which has been collected in the collection step S104 is purified in the purification step S5, and then the plasticizer and a polyolefin resin are kneaded in the second kneading and forming step S6. This allows a reduction in amount of use of a plasticizer by reusing, to produce the separator original sheet 51, the plasticizer which has been collected in the collection step S104. Note that a new plasticizer that has not been subjected to the collection step S104 can be further added in the second kneading and forming step S6.

In the production flow in accordance with Embodiment 2, the separation step S4 described earlier is omitted. Note, however, that both the separation step S4 and the collection step S104 can be carried out. In this case, a mixture of the plasticizer which has been separated in the separation step S4 and the plasticizer which has been collected in the collection step S104 can be purified in a single purification step S5. Alternatively, the plasticizer which has been separated in the separation step S4 and the plasticizer which has been collected in the collection step S104 can be separately purified in respective purification steps S5. The plasticizers which have been separately purified in the respective purification steps S5 can be reused in the second kneading and forming step S6 by being mixed. Further, also in this case, a new plasticizer can be further added in the second kneading and forming step S6.

Note that a method or a degree of purification in the purification step S5 can be changed (selected) in accordance with purify of the plasticizer which has been collected in the collection step S104. The plasticizer which is collected in the collection step S104 varies in purity depending on how and/or where to collect the plasticizer. Thus, depending on purity of the plasticizer which has been collected, the plasticizer can be purified by a simple purification method in the purification step S5, or purification of the plasticizer per se can be omitted. This makes it possible to obtain a plasticizer with high purity while reducing time and cost required for purification of a plasticizer.

Embodiment 3

Figure 5:
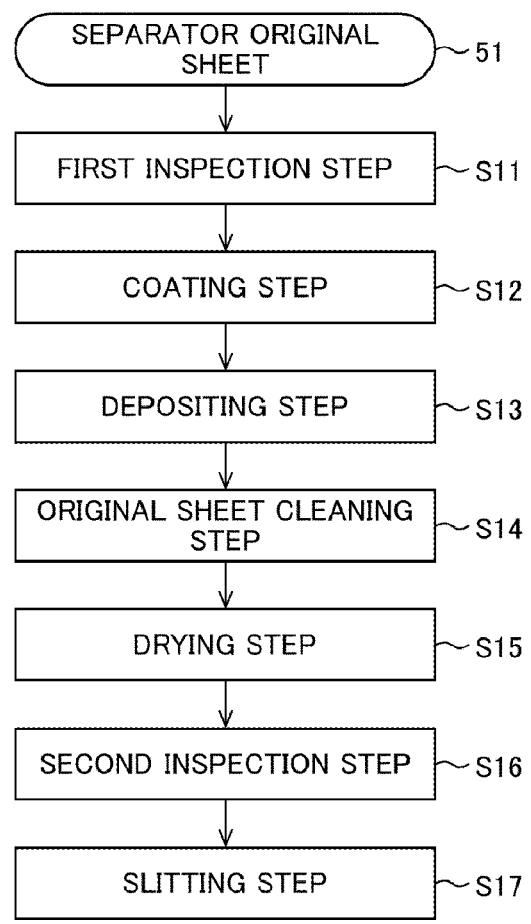
FIG. 5 is a flow chart schematically showing a method for producing a separator in accordance with Embodiment 3 of the present invention.
Figure 6:
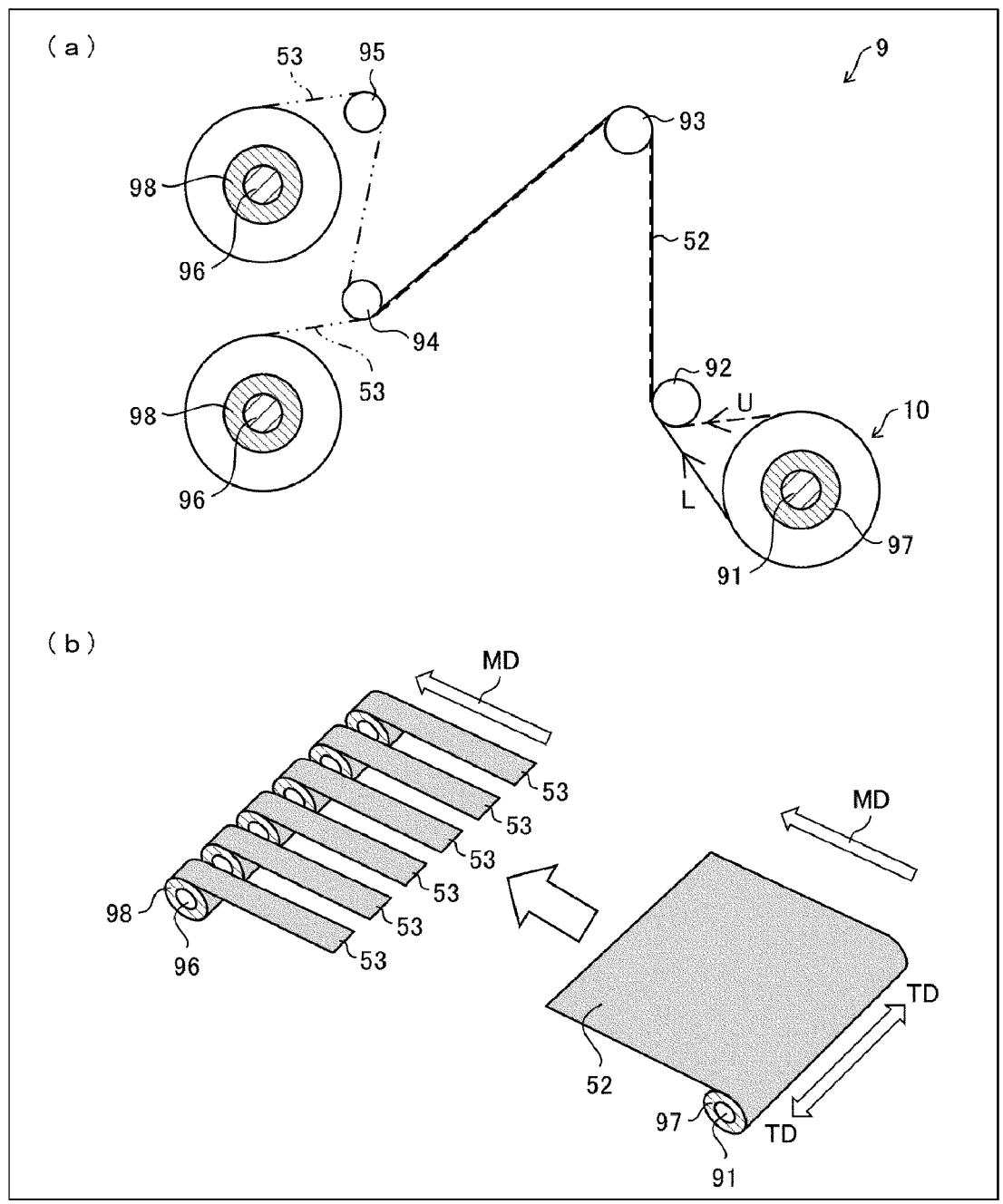
FIG. 6 is a diagram schematically showing an example of a slitting step illustrated in FIG. 5.

The following description discusses a further embodiment of the present invention with reference to FIGS. 5 and 6. The description of Embodiment 3 discusses an example of a method for producing a separator for a lithium ion secondary battery by using, as a base material, the separator original sheet which is obtained in Embodiment 1 or 2 (a separator producing method). Note that components identical to those described in Embodiments 1 and 2 are given respective identical reference signs, and a specific description of those components is omitted here.

(Separator Producing Method)

FIG. 5 is a flow chart schematically showing a method for producing a separator in accordance with Embodiment 3. The separator is arranged such that a functional layer is provided on a separator original sheet 51 which serves as a base material. Examples of the functional layer include a heat-resistant layer and an adhesive layer.

The functional layer is provided on the separator original sheet 51 by coating the separator original sheet 51 with a coating material (material) or the like corresponding to the functional layer, and then drying the coating material.

FIG. 5 shows a flow of production of a heat-resistant separator in a case where the functional layer is a heat-resistant layer. The flow shown in FIG. 5 is an example of a flow in which the heat-resistant layer is made of a wholly aromatic polyamide (aramid resin) and such a heat-resistant layer is disposed on the separator original sheet 51.

The flow includes a first inspection step S11, a coating step S12, a depositing step S13, an original sheet cleaning step S14, a drying step S15, a second inspection step S16, and a slitting step S17.

The steps S11 through S17 following the flow of production of the separator original sheet 51, which flow is described in Embodiments 1 and 2, are sequentially described below.

(First Inspection Step S11)

The first inspection step S11 is a step of inspecting the separator original sheet 51, which has been obtained in Embodiment 1, before carrying out the subsequent coating step.

(Coating Step S12)

The coating step S12 is a step of coating, with a coating material (material) for the heat-resistant layer, the separator original sheet 51 which has been inspected in the first inspection step S11. In the coating step S12, such coating can be carried out with respect to only one surface or both surfaces of the separator original sheet 51.

For example, in the coating step S12, the separator original sheet 51 is coated with an N-methyl-pyrrolidone (NMP) solution of aramid, which solution is used as the coating material for the heat-resistant layer. Note that the heat-resistant layer is not limited to an aramid heat-resistant layer. For example, such coating can also be carried out by using a suspension of alumina, carboxymethyl cellulose, and water as the coating material for the heat-resistant layer.

The separator original sheet 51 can be coated with the coating material by a method that is exemplified by but not particularly limited to various methods, provided that the method allows the separator original sheet 51 to be subjected to uniform wet coating.

For example, such coating can be carried out by a capillary coating method, a slit die coating method, a spray coating method, a dip coating method, a roll coating method, a screen printing method, a flexo printing method, a bar coater method, a gravure coater method, or a die coater method.

The material for the heat-resistant layer with which material the separator original sheet 51 is coated has a film thickness that can be controlled by adjusting a thickness of a coating wet film and a solid content concentration of a coating liquid.

(Depositing Step S13)

The depositing step S13 is a step of solidifying the coating material with which the separator original sheet 51 has been coated in the coating step S12. In a case where the coating material is an aramid coating material, for example, water vapor is applied to a coated surface of the separator original sheet 51 so that aramid is solidified by humidity deposition. This makes it possible to obtain a heat-resistant separator original sheet 52 (see FIG. 6), which is the separator original sheet 51 which is provided with the heat-resistant layer.

(Original Sheet Cleaning Step S14)

The original sheet cleaning step S14 is a step of cleaning the heat-resistant separator original sheet 52 which has been obtained in the depositing step S13 by solidifying the coating material. In a case where the heat-resistant layer is an aramid heat-resistant layer, for example, water, an aqueous solution, or an alcohol-based solution is suitably used as a cleaning liquid.

Note that in order to enhance a cleaning effect, the original sheet cleaning step S14 can be multistage cleaning in which cleaning is carried out a plurality of times.

It is also possible to carry out, after the original sheet cleaning step S14, a water removing step of removing water from the heat-resistant separator original sheet 52 which has been cleaned in the original sheet cleaning step S14. The water is removed so as to achieve easy drying and prevention of insufficient drying by eliminating, before carrying out the subsequent drying step S15, water or the like having adhered to the heat-resistant separator original sheet 52.

(Drying Step S15)

The drying step S15 is a step of drying the heat-resistant separator original sheet 52 which has been cleaned in the original sheet cleaning step S14. The heat-resistant separator original sheet 52 can be dried by a method that is exemplified by but not particularly limited to various methods such as (i) a method in which the heat-resistant separator original sheet 52 is brought into contact with a heated roller and (ii) a method in which hot air is blown onto the heat-resistant separator original sheet 52.

(Second Inspection Step S16)

The second inspection step S16 is a step of inspecting the heat-resistant separator original sheet 52 which has been dried in the drying step S15. During the inspection, by appropriately marking a defective part, it is possible to effectively prevent the heat-resistant separator original sheet 52 from having a defect.

(Slitting Step S17)

The slitting step S17 is a step of slitting (cutting), into pieces each having a predetermined product width, the heat-resistant separator original sheet 52 which has been inspected in the second inspection step S16. Specifically, in the slitting step S17, the heat-resistant separator original sheet 52 is slit into pieces each having a product width that is suitable for an application product such as a lithium-ion secondary battery.

Each of (a) and (b) of FIG. 6 is a diagram schematically showing an example of the slitting step S17. The slitting step S17 is carried out by use of a slitting device 9 that slits the heat-resistant separator original sheet 52 (see (a) and (b) of FIG. 6).

The slitting device 9 includes a wind-off roller 91, rollers 92 through 95, and a plurality of take-up rollers 96. Each of the wind-off roller 91, the rollers 92 through 95, and the plurality of take-up rollers 96 is cylindrical and is rotatably supported. The slitting device 9 also includes a plurality of blades (not illustrated). A roll 10 is fitted to the wind-off roller 91. The roll 10 is a roll of the heat-resistant separator original sheet 52 which is wound on an outer circumferential surface of a core 97 so as to be layered.

In order to enhance productivity, the heat-resistant separator original sheet 52 is usually produced so as to have a width that is not less than the product width. After being temporarily produced so as to have a width that is not less than the product width, the heat-resistant separator original sheet 52 is slit into heat-resistant separators 53 each having the product width.

Specifically, in the slitting step S17, the heat-resistant separator original sheet 52 is wound off from the core 97 to a path U or a path L. The heat-resistant separator original sheet 52 thus wound off is transferred via the rollers 92 and 93 to the roller 94. While being transferred, the heat-resistant separator original sheet 52 is slit so as to be substantially parallel to the transfer direction MD. This makes it possible to produce a plurality of heat-resistant separators 53, into which the heat-resistant separator original sheet 52 has been slit so as to have the product width. The plurality of heat-resistant separators 53 thus produced are wound on respective cores 98 fitted to the respective the take-up rollers 96.

[Recap]

A method of producing a film in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition; an elution step including immersing, in a cleaning solvent, the first film composition which has been stretched, and eluting the plasticizer from the first film composition to form a microporous film; a separation step including separating, from the cleaning solvent which has been used in the elution step, the plasticizer which has been eluted in the cleaning solvent; a second kneading step including kneading at least a second polyolefin resin and the plasticizer which has been separated in the separation step to form a second composition; and a second forming step including forming the second composition into a second film composition.

In a case where a plasticizer contained in a stretched first film composition is removed from that film composition by immersing the first film composition in a cleaning solvent, the plasticizer has been eluted in a large amount in the cleaning solvent which has been used. The method includes a separation step including separating the plasticizer from the cleaning solvent which has been used, and the method is arranged such that a second polyolefin resin and the plasticizer which has been separated in the separation step are kneaded in the second kneading step. Thus, according to the method, the plasticizer which has been separated in the separation step can be reused to produce a film. This makes it possible to achieve a method of producing a film, the method allowing a plasticizer to be used in a smaller amount.

The method of producing a film in accordance with an aspect of the present invention can further include a purification step including purifying the plasticizer which has been separated in the separation step.

The method further includes a purification step including purifying the plasticizer which has been separated in the separation step. This makes it possible to eliminate impurities such as an additive and consequently to obtain a plasticizer with high purity. Thus, according to the method, it is possible to prevent a change in film characteristic which change is caused by mixing of impurities in the plasticizer.

The method of producing a film in accordance with an aspect of the present invention can be arranged such that the plasticizer is purified by distillation in the purification step.

According to the method, the plasticizer is purified by distillation. This makes it possible to more reliably eliminate impurities from the plasticizer. Thus, according to the method, it is possible to obtain a plasticizer with higher purity.

The method of producing a film in accordance with an aspect of the present invention can be arranged such that the plasticizer is purified by adsorption in the purification step.

According to the method, the plasticizer, which is purified by adsorption, can be purified at a low temperature in a short time without heating. Thus, according to the method, it is possible to purify the plasticizer without a change in characteristic of the plasticizer which change is caused by heating.

The method of producing a film in accordance with an aspect of the present invention can be arranged such that: the first kneading step includes kneading the first polyolefin resin, the plasticizer and an antioxidant to form the first composition; and such that the antioxidant is eliminated in the purification step.

In a plasticizer that is obtained, by being removed and separated, from a composition obtained by kneading a first polyolefin resin, the plasticizer, and an antioxidant, the antioxidant is contained in a given amount. In a case where an amount of an antioxidant contained in a composition per unit amount (hereinafter may be referred to as an "antioxidant content") is changed, a characteristic of a film to be produced is changed. Thus, an antioxidant content is desirably constant. According to the method, since an antioxidant (impurities) mixed in the plasticizer is eliminated in the purification step, the plasticizer which is introduced in the second kneading step contains no antioxidant or only a small amount of the antioxidant. This allows an amount of the antioxidant contained in the composition per unit amount to be easily maintained at a constant amount in the second kneading step. Therefore, according to the method, it is possible to prevent a change in film characteristic which change is caused by a change in antioxidant content.

The method of producing a film in accordance with an aspect of the present invention can further include a collection step including collecting an amount of the plasticizer which has been released from the first composition or the first film composition in at least one of the first kneading step, the first forming step and the stretching step, wherein the amount of the plasticizer which has been collected in the collection step is added to the second composition in the second kneading step.

In the first kneading step, the first forming step, and the stretching step, the plasticizer which is contained in the first composition or the first film composition may be released from that composition by, for example, dropping or volatilizing. The method further includes a collection step including collecting an amount of the plasticizer which has been released from the first composition or the first film composition in at least one of the first kneading step, the first forming step and the stretching step, and the method is arranged such that the second polyolefin resin and the amount of the plasticizer which has been collected in the collection step are kneaded in the second kneading step. Thus, according to the method, the plasticizer which has been collected in the collection step can be reused to produce a film. This allows a plasticizer to be used in a still smaller amount.

A method of producing a separator in accordance with an aspect of the present invention includes a coating step including coating the film produced by the method of claim 1 with a material to form a functional layer on the film.

The method includes a coating step including coating the film produced by the method of producing a film with a material to form a functional layer on the film. This makes it possible to produce a separator including the film as a base material. Thus, the method of producing a separator makes it possible to achieve a method of producing a separator, the method allowing a plasticizer to be used in a smaller amount.

A method of producing a film in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition, wherein an amount of the plasticizer is released from either the first composition or the first film composition in at least one of the first kneading step, the first forming step and the stretching step; an elution step including immersing, in a cleaning solvent, the first film composition which has been stretched, and eluting the plasticizer from the first film composition to form a microporous film; a collection step including collecting the amount of the plasticizer which has been released from the first composition or the first film composition in at least one of the first kneading step, the first forming step and the stretching step; a second kneading step including kneading at least a second polyolefin resin and the plasticizer which has been collected in the collection step to form a second composition; and a second forming step including forming the second composition into a second film composition.

In the first kneading step, the first forming step, and the stretching step, the plasticizer which is contained in the first composition or the first film composition may be released from that composition by, for example, dropping or volatilizing. The method includes a collection step including collecting an amount of the plasticizer which has been released from the first composition or the first film composition in at least one of the first kneading step, the first forming step and the stretching step, and the method is arranged such that the second polyolefin resin and the amount of the plasticizer which has been collected in the collection step are kneaded in the second kneading step. Thus, according to the method, the plasticizer which has been collected in the collection step can be reused to produce a film. This makes it possible to achieve a method of producing a film, the method allowing a plasticizer to be used in a smaller amount.

The method of producing a film in accordance with an aspect of the present invention can further include a purification step including purifying the plasticizer which has been collected in the collection step.

The method further includes a purification step including purifying the plasticizer which has been collected in the collection step. This makes it possible to eliminate impurities such as an additive and consequently to obtain a plasticizer with high purity. Thus, according to the method, it is possible to prevent a change in film characteristic which change is caused by mixing of impurities in the plasticizer.

A method of producing a film in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition; an elution step including immersing, in a cleaning solvent, the first film composition which has been stretched, and eluting the plasticizer from the first film composition to form a microporous film; a collection step including collecting an amount of the plasticizer from at least one of (i) a plasticizer which has been released from the first composition or the first film composition in at least one of the first kneading step, the first forming step and the stretching step, and (ii) a plasticizer which has been eluted from the first film composition in the elution step and separated from the cleaning solvent which has been used in the elution step; a second kneading step including kneading at least a second polyolefin resin and the plasticizer which has been collected in the collection step to form a second composition; and a second forming step including forming the second composition into a second film composition.

According to the method, the plasticizer which has been collected in the collection step can be reused to produce a film. This makes it possible to achieve a method of producing a film, the method allowing a plasticizer to be used in a smaller amount.

A method of producing a plasticizer in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition; an elution step including immersing, in a cleaning solvent, the first film composition which has been stretched, and eluting the plasticizer from the first film composition to form a microporous film; and a separation step including separating, from the cleaning solvent which has been used in the elution step, the plasticizer which has been eluted in the cleaning solvent.

In a case where a plasticizer contained in a stretched first film composition is removed from that film composition by immersing the first film composition in a cleaning solvent, the plasticizer has been eluted in a large amount in the cleaning solvent which has been used. The method includes a separation step including separating the plasticizer from the cleaning solvent which has been used. Thus, according to the method, it is possible to achieve a method of producing a plasticizer, the method allowing reuse of a plasticizer that has been separated from a used cleaning solvent.

The method of producing a plasticizer in accordance with an aspect of the present invention can further include a purification step including purifying the plasticizer which has been separated in the separation step.

The method further includes a purification step including purifying the plasticizer which has been separated in the separation step. This makes it possible to eliminate impurities such as an additive and consequently to obtain a plasticizer with high purity.

The method of producing a plasticizer in accordance with an aspect of the present invention can be arranged such that the plasticizer is purified by distillation in the purification step.

According to the method, the plasticizer is purified by distillation. This makes it possible to more reliably eliminate impurities from the plasticizer. Thus, according to the method, it is possible to obtain a plasticizer with higher purity.

The method of producing a plasticizer in accordance with an aspect of the present invention can be arranged such that the plasticizer is purified by adsorption in the purification step.

According to the method, the plasticizer, which is purified by adsorption, can be purified at a low temperature in a short time without heating. Thus, according to the method, it is possible to purify the plasticizer without a change in characteristic of the plasticizer which change is caused by heating.

The method of producing a plasticizer in accordance with an aspect of the present invention can further include a collection step including collecting an amount of the plasticizer which has been released from the first composition or the first film composition in at least one of the first kneading step, the first forming step and the stretching step.

In the first kneading step, the first forming step, and the stretching step, the plasticizer which is contained in the first composition or the first film composition may be released from that composition by, for example, dropping or volatilizing. The method includes a collection step including collecting an amount of the plasticizer which has been released from the first composition or the first film composition in at least one of the first kneading step, the first forming step and the stretching step. Thus, according to the method, it is possible to achieve a method of producing a plasticizer, the method allowing reuse of a plasticizer that has been collected in the collection step.

A method of producing a plasticizer in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition, wherein an amount of the plasticizer is released from either the first composition or the first film composition in at least one of the first kneading step, the first forming step and the stretching step; an elution step including immersing, in a cleaning solvent, the first film composition which has been stretched, and eluting the plasticizer from the first film composition to form a microporous film; and a collection step including collecting the amount of the plasticizer which has been released from the first composition or the first film composition in at least one of the first kneading step, the first forming step and the stretching step.

In the first kneading step, the first forming step, and the stretching step, the plasticizer which is contained in the first composition or the first film composition may be released from that composition by, for example, dropping or volatilizing. The method includes a collection step including collecting an amount of the plasticizer which has been released from the first composition or the first film composition in at least one of the first kneading step, the first forming step and the stretching step. Thus, according to the method, the plasticizer which has been collected in the collection step can be reused to produce a film. Thus, according to the method, it is possible to achieve a method of producing a plasticizer, the method allowing reuse of a plasticizer that has been collected in the collection step.

The method of producing a plasticizer in accordance with an aspect of the present invention can further include a purification step including purifying the plasticizer which has been collected in the collection step.

The method further includes a purification step including purifying the plasticizer which has been collected in the collection step. This makes it possible to eliminate impurities such as an additive and consequently to obtain a plasticizer with high purity.

A method of producing a plasticizer in accordance with an aspect of the present invention includes: a first kneading step including kneading at least a first polyolefin resin and a plasticizer to form a first composition; a first forming step including forming the first composition into a first film composition; a stretching step including at least uniaxially stretching the first film composition;

an elution step including immersing, in a cleaning solvent, the first film composition which has been stretched, and eluting the plasticizer from the first film composition to form a microporous film; and a collection step including collecting an amount of the plasticizer from at least one of (i) a plasticizer which has been released from the first composition or the first film composition in at least one of the first kneading step, the first forming step and the stretching step, and (ii) a plasticizer which has been eluted from the first film composition in the elution step and separated from the cleaning solvent which has been used in the elution step.

According to the method, it is possible to achieve a method of producing a plasticizer, the method allowing reuse of a plasticizer that has been collected in the collection step.

SUPPLEMENTAL REMARKS

Note that the present invention can be expressed as below. Specifically, a film producing method in accordance with an aspect of the present invention includes: a first kneading and forming step of forming, into a film composition, a composition obtained by kneading at least a polyolefin resin and a plasticizer; a stretching step of at least uniaxially stretching the film composition which has been formed; a cleaning step of immersing, in a cleaning solvent, the film composition which has been stretched, and removing the plasticizer from the film composition; a separation step of separating, from the cleaning solvent which has been used in the cleaning step, the plasticizer which has been eluted in the cleaning solvent; and a second kneading and forming step of forming, into a film composition, a composition obtained by kneading at least a polyolefin resin and the plasticizer which has been separated in the separation step.

The film producing method in accordance with an aspect of the present invention can further include a collection step of collecting the plasticizer which has been released from the composition in at least one step selected from the group consisting of the first kneading and forming step and the stretching step, wherein the plasticizer which has been collected in the collection step is added to the composition in the second kneading and forming step.

The film producing method in accordance with an aspect of the present invention can further include a purification step of purifying the plasticizer which has been separated in the separation step.

A film producing method in accordance with an aspect of the present invention includes: a first kneading and forming step of forming, into a film composition, a composition obtained by kneading at least a polyolefin resin and a plasticizer; a stretching step of at least uniaxially stretching the film composition which has been formed; a cleaning step of immersing, in a cleaning solvent, the film composition which has been stretched, and removing the plasticizer from the film composition; a collection step of collecting the plasticizer which has been released from the composition in at least one step selected from the group consisting of the first kneading and forming step and the stretching step; a second kneading and forming step of forming, into a film composition, a composition obtained by kneading at least a polyolefin resin and the plasticizer which has been collected in the collection step.

The film producing method in accordance with an aspect of the present invention can further include a purification step of purifying the plasticizer which has been collected in the collection step.

The film producing method in accordance with an aspect of the present invention can be arranged such that the plasticizer is purified by distillation in the purification step.

The film producing method in accordance with an aspect of the present invention can be arranged such that the plasticizer is purified by adsorption in the purification step.

The film producing method in accordance with an aspect of the present invention can be arranged such that: an antioxidant in addition to the polyolefin resin and the plasticizer is kneaded in the first kneading and forming step; and the antioxidant which has been mixed in the plasticizer is eliminated in the purification step.

A separator producing method in accordance with an aspect of the present invention includes a coating step of coating, with a material of which a functional layer is to be made, a film produced by a film producing method mentioned above.

A plasticizer producing method in accordance with an aspect of the present invention includes: a first kneading and forming step of forming, into a film composition, a composition obtained by kneading at least a polyolefin resin and a plasticizer; a stretching step of at least uniaxially stretching the film composition which has been formed; a cleaning step of immersing, in a cleaning solvent, the film composition which has been stretched, and removing the plasticizer from the film composition; and a separation step of separating, from the cleaning solvent which has been used in the cleaning step, the plasticizer which has been eluted in the cleaning solvent.

The plasticizer producing method in accordance with an aspect of the present invention can further include a purification step of purifying the plasticizer which has been separated in the separation step.

A plasticizer producing method in accordance with an aspect of the present invention includes: a first kneading and forming step of forming, into a film composition, a composition obtained by kneading at least a polyolefin resin and a plasticizer; a stretching step of at least uniaxially stretching the film composition which has been formed; a cleaning step of immersing, in a cleaning solvent, the film composition which has been stretched, and removing the plasticizer from the film composition; and a collection step of collecting the plasticizer which has been released from the composition in at least one step selected from the group consisting of the first kneading and forming step and the stretching step.

The plasticizer producing method in accordance with an aspect of the present invention can further include a purification step of purifying the plasticizer which has been collected in the collection step.

The plasticizer producing method in accordance with an aspect of the present invention can be arranged such that the plasticizer is purified by distillation in the purification step.

The plasticizer producing method in accordance with an aspect of the present invention can be arranged such that the plasticizer is purified by adsorption in the purification step.

The present invention is not limited to the arrangements described above, but may be altered in ways by a skilled person within the scope of the claims. Any embodiment based on a proper combination of technical means disclosed in different embodiments is also encompassed in the technical scope of the present invention.

REFERENCE SIGNS LIST

41 Cleaning liquid (cleaning solvent)
51 Separator original sheet (film)
53 Heat-resistant separator (separator)
S1 First kneading and forming step (first kneading step and first forming step)
S2 Stretching step
S3 Composition cleaning step (cleaning step and elution step)
S4 Separation step
S5 Purification step
S6 Second kneading and forming step (second kneading step and second forming step)
S12 Coating step
S104 Collection step

The invention claimed is:
1. A method of producing a film comprising:
a first kneading step comprising kneading at least a first polyolefin resin and a plasticizer to form a first composition;
a first forming step comprising forming the first composition into a first film composition;
a stretching step comprising at least uniaxially stretching the first film composition;
an elution step comprising immersing, in a cleaning solvent, the first film composition which has been stretched, and eluting the plasticizer from the first film composition to form a microporous film;
a separation step comprising separating, from the cleaning solvent which has been used in the elution step, the plasticizer which has been eluted in the cleaning solvent;

a second kneading step comprising kneading at least a second polyolefin resin and the plasticizer which has been separated in the separation step to form a second composition;

a second forming step comprising forming the second composition into a second film composition; and a collection step comprising collecting an amount of the plasticizer which has volatilized from the first composition or the first film composition in at least one of the first kneading step, the first forming step and the stretching step.

2. The method of producing a film as set forth in claim 1, further comprising a purification step comprising purifying the plasticizer which has been separated in the separation step.

3. The method of producing a film as set forth in claim 2, wherein the plasticizer is purified by distillation in the purification step.

4. The method of producing a film as set forth in claim 2, wherein the plasticizer is purified by adsorption in the purification step.

5. The method of producing a film as set forth in claim 2,
wherein the first kneading step comprises kneading the first polyolefin resin, the plasticizer and an antioxidant to form the first composition; and
wherein the antioxidant is eliminated in the purification step.

6. The method of producing a film as set forth in claim 1, wherein the amount of the plasticizer which has been collected in the collection step is added to the second composition in the second kneading step.

7. A method of producing a separator comprising a coating step comprising coating the film produced by the method of claim 1 with a material to form a functional layer on the film.

8. A method of producing a film comprising:
a first kneading step comprising kneading at least a first polyolefin resin and a plasticizer to form a first composition;
a first forming step comprising forming the first composition into a first film composition;
a stretching step comprising at least uniaxially stretching the first film composition, wherein an amount of the plasticizer is released from either the first composition or the first film composition in at least one of the first kneading step, the first forming step and the stretching step;
an elution step comprising immersing, in a cleaning solvent, the first film composition which has been stretched, and eluting the plasticizer from the first film composition to form a microporous film;
a collection step comprising collecting an amount of the plasticizer which has volatilized from the first composition or the first film composition in at least one of the first kneading step, the first forming step and the stretching step;
a second kneading step comprising kneading at least a second polyolefin resin and the plasticizer which has been collected in the collection step to form a second composition; and
a second forming step comprising forming the second composition into a second film composition.

9. The method of producing a film as set forth in claim 8, further comprising a purification step comprising purifying the plasticizer which has been collected in the collection step.

10. A method of producing a film comprising:
a first kneading step comprising kneading at least a first polyolefin resin and a plasticizer to form a first composition;
a first forming step comprising forming the first composition into a first film composition;
a stretching step comprising at least uniaxially stretching the first film composition;
an elution step comprising immersing, in a cleaning solvent, the first film composition which has been stretched, and eluting the plasticizer from the first film composition to form a microporous film;
a collection step comprising collecting an amount of the plasticizer which has volatilized from the first composition or the first film composition in at least one of the first kneading step, the first forming step and the stretching step;
a second kneading step comprising kneading at least a second polyolefin resin and the plasticizer which has been collected in the collection step to form a second composition; and
a second forming step comprising forming the second composition into a second film composition.

11. A method of producing a plasticizer comprising:
a first kneading step comprising kneading at least a first polyolefin resin and a plasticizer to form a first composition;
a first forming step comprising forming the first composition into a first film composition;
a stretching step comprising at least uniaxially stretching the first film composition;
an elution step comprising immersing, in a cleaning solvent, the first film composition which has been stretched, and eluting the plasticizer from the first film composition to form a microporous film;
a separation step comprising separating, from the cleaning solvent which has been used in the elution step, the plasticizer which has been eluted in the cleaning solvent; and
a collection step comprising collecting an amount of the plasticizer which has volatilized from the first composition or the first film composition in at least one of the first kneading step, the first forming step and the stretching step.

12. The method of producing a plasticizer as set forth in claim 11, further comprising a purification step comprising purifying the plasticizer which has been separated in the separation step.

13. The method of producing a plasticizer as set forth in claim 12, wherein the plasticizer is purified by distillation in the purification step.

14. The method of producing a plasticizer as set forth in claim 12, wherein the plasticizer is purified by adsorption in the purification step.

15. A method of producing a plasticizer comprising:
a first kneading step comprising kneading at least a first polyolefin resin and a plasticizer to form a first composition;
a first forming step comprising forming the first composition into a first film composition;
a stretching step comprising at least uniaxially stretching the first film composition, wherein an amount of the plasticizer is released from either the first composition or the first film composition in at least one of the first kneading step, the first forming step and the stretching step;

an elution step comprising immersing, in a cleaning solvent, the first film composition which has been stretched, and eluting the plasticizer from the first film composition to form a microporous film; and a collection step comprising collecting an amount of the plasticizer which has volatilized from the first composition or the first film composition in at least one of the first kneading step, the first forming step and the stretching step.

16. The method of producing a plasticizer as set forth in claim 15, further comprising a purification step comprising purifying the plasticizer which has been collected in the collection step.

17. A method of producing a plasticizer comprising:

a first kneading step comprising kneading at least a first polyolefin resin and a plasticizer to form a first composition;

a first forming step comprising forming the first composition into a first film composition;

a stretching step comprising at least uniaxially stretching the first film composition;

an elution step comprising immersing, in a cleaning solvent, the first film composition which has been stretched, and eluting the plasticizer from the first film composition to form a microporous film; and a collection step comprising collecting an amount of the plasticizer which has volatilized from the first composition or the first film composition in at least one of the first kneading step, the first forming step and the stretching step.

* * * * *